(12) United States Patent
Reed et al.

(10) Patent No.: US 9,569,092 B2
(45) Date of Patent: Feb. 14, 2017

(54) RADIAL CONTROL SYSTEM AND METHOD

(71) Applicant: ALLSCRIPTS SOFTWARE, LLC, Chicago, IL (US)

(72) Inventors: Christy Jill Reed, Raleigh, NC (US); Leigh Randal McClure, Raleigh, NC (US)

(73) Assignee: ALLSCRIPTS SOFTWARE, LLC, Chicago, IL (US)

( * ) Notice: Subject to any disclaimer, the term of this patent is extended or adjusted under 35 U.S.C. 154(b) by 825 days.

(21) Appl. No.: 13/826,301

(22) Filed: Mar. 14, 2013

(65) Prior Publication Data

US 2014/0223373 A1 Aug. 7, 2014

Related U.S. Application Data

(60) Provisional application No. 61/760,002, filed on Feb. 1, 2013.

(51) Int. Cl.
*G06F 3/048* (2013.01)
*G06F 3/0488* (2013.01)
*G06F 3/01* (2006.01)

(52) U.S. Cl.
CPC .................... *G06F 3/0488* (2013.01)

(58) Field of Classification Search
CPC ... G06F 3/0488; G06F 3/04886; G06F 3/0482
See application file for complete search history.

(56) References Cited

U.S. PATENT DOCUMENTS

| | | | | |
|---|---|---|---|---|
| 6,144,378 A | * | 11/2000 | Lee | G06F 3/0236 715/767 |
| 6,549,219 B2 | * | 4/2003 | Selker | G06F 3/0482 345/902 |
| 7,992,102 B1 | * | 8/2011 | De Angelo | G06F 3/0482 715/804 |
| 2004/0233238 A1 | * | 11/2004 | Lahdesmaki | G06F 3/0482 715/810 |
| 2006/0048076 A1 | * | 3/2006 | Vronay | G06F 3/0482 715/850 |
| 2007/0005477 A1 | * | 1/2007 | McAtamney | G06F 3/04845 705/35 |
| 2007/0180392 A1 | * | 8/2007 | Russo | G06F 3/0482 715/765 |
| 2007/0188494 A1 | * | 8/2007 | Agutter | G06F 17/30554 345/440 |
| 2010/0229130 A1 | * | 9/2010 | Edge | G06F 3/04886 715/863 |

(Continued)

*Primary Examiner* — Nicholas Augustine
(74) *Attorney, Agent, or Firm* — Tillman Wright, PLLC; Chad D. Tillman; Jeremy C. Doerre

(57) ABSTRACT

A method includes displaying, to a user via an electronic display, a radial control comprising a plurality of concentric arcs, the radial control including a first central section defined by a first arc of the plurality of concentric arcs, and a plurality of child sections collectively defined by the first arc and the other arcs of the plurality of concentric arcs, the plurality of child sections being delineated from one another by dividers extending between two or more arcs of the plurality of concentric arcs, wherein the first central section is associated with a parent activity and each of the plurality of child sections is associated with a child activity related to the parent activity.

9 Claims, 7 Drawing Sheets

(56) References Cited

U.S. PATENT DOCUMENTS

| | | | |
|---|---|---|---|
| 2011/0047014 A1* | 2/2011 | De Angelo | G06F 3/0482 705/14.4 |
| 2011/0219324 A1* | 9/2011 | Watanabe | G06F 3/048 715/771 |
| 2012/0124520 A1* | 5/2012 | Samp | G06F 3/04886 715/834 |
| 2013/0019174 A1* | 1/2013 | Gil | G06F 3/04812 715/711 |
| 2013/0080975 A1* | 3/2013 | Geithner | G06F 3/0488 715/828 |

* cited by examiner

RADIAL CONTROL SYSTEM AND METHOD

CROSS-REFERENCE TO RELATED APPLICATION

The present application is a U.S. nonprovisional patent application of, and claims priority under 35 U.S.C. §119(e) to, U.S. provisional patent application Ser. No. 61/760,002, filed Feb. 1, 2013, which provisional patent application is incorporated by reference herein. The present application also hereby incorporates herein by reference the entire disclosure of Exhibit 1 attached hereto.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention relates to software applications. More specifically, the present invention relates to navigating in a software application.

Software applications utilize various navigation schemes designed to allow users to utilize functionality thereof. However, it can be very difficult to represent a non-linear task flow that clearly indicates to the user where they are within the application. Exemplary known methodologies for navigation include the use of tabs and breadcrumb trails. Tabs support non-linear browsing, but showing a relationship between tabs is challenging. Breadcrumb trails allow a user to move through a task flow, but breadcrumb trails do not support non-linearity in activities.

There exists a need for an improved method for supporting a non-linear task workflow that allows users to freely navigate between related activities in order to complete their main task (parent activity). This, and other needs, are addressed by one or more aspects of the present invention.

SUMMARY OF THE INVENTION

The present invention includes many aspects and features. Moreover, while many aspects and features relate to, and are described in, the context of tablet computing, the present invention is not limited to use only in this context, as will become apparent from the following summaries and detailed descriptions of aspects, features, and one or more embodiments of the present invention.

Accordingly, one aspect of the present invention relates to a method comprising displaying, to a user via an electronic display, a first application interface, and a radial control comprising a plurality of concentric arcs, the radial control including a first central section defined by a first arc of the plurality of concentric arcs, and a plurality of child sections collectively defined by the first arc and the other arcs of the plurality of concentric arcs, the plurality of child sections being delineated from one another by dividers extending between two or more arcs of the plurality of concentric arcs, wherein the first central section is associated with a parent activity and each of the plurality of child sections is associated with a child activity related to the parent activity. The method further comprises receiving, at an electronic device in electronic communication with the electronic display, user input from the user, the user input corresponding to selection of one of the child sections, and displaying, to the user via the electronic display, in response to the user input corresponding to selection of one of the child sections, a second application interface, the second application interface being associated with the child activity associated with the selected one of the child sections, the radial control, wherein the selected one of the child sections is highlighted in indication of the user selection, whereby the user is able to discern a current activity based on viewing the radial control.

In a feature of this aspect, the electronic display comprises a touchscreen display. In at least some implementations, receiving user input from the user comprises receiving user input via the touchscreen display.

In a feature of this aspect, the electronic device comprises a tablet.

In a feature of this aspect, the electronic device comprises a tablet, the electronic display comprises a touchscreen display, and receiving user input from the user comprises receiving user input via the touchscreen display.

In a feature of this aspect, the electronic device comprises a slate computer.

In a feature of this aspect, when the selected one of the child sections is highlighted in indication of the user selection, the selected one of the child sections is highlighted by changing a color of the selected one of the child sections.

Another aspect relates to a method comprising displaying, to a user via an electronic display, a first application interface, and a radial control comprising a plurality of concentric arcs, the radial control including a first central section defined by a first arc of the plurality of concentric arcs, and a plurality of child sections collectively defined by the first arc and the other arcs of the plurality of concentric arcs, the plurality of child sections being delineated from one another by dividers extending between two or more arcs of the plurality of concentric arcs, wherein the first central section is associated with a parent activity and each of the plurality of child sections is associated with a child activity related to the parent activity. The method further comprises receiving, at an electronic device in electronic communication with the electronic display, user input from the user, the user input corresponding to selection of one of the child sections, and displaying, to the user via the electronic display, in response to the user input corresponding to selection of one of the child sections, a second application interface, the second application interface being associated with the child activity associated with the selected one of the child sections, the radial control, wherein the selected one of the child sections is highlighted in indication of the user selection, whereby the user is able to discern a current activity based on viewing the radial control. The method further comprises determining that a predetermined period of time has passed without the displayed radial control having been utilized, and collapsing, based on the determination that a predetermined period of time has passed without the radial control having been utilized, the displayed radial control so as to reduce the size of the radial control and the footprint of the radial control on the display.

In a feature of this aspect, collapsing the displayed radial control comprises reducing the distance between the plurality of concentric arcs of the radial control.

In a feature of this aspect, the method further includes receiving, at the electronic device, user input from the user, the user input corresponding to a touching of the radial control, and expanding, in response to the receiving user input corresponding to a touching of the radial control, the radial control.

In a feature of this aspect, the electronic display comprises a touchscreen display. In at least some implementations, receiving user input from the user comprises receiving user input via the touchscreen display.

In a feature of this aspect, the electronic device comprises a tablet.

In a feature of this aspect, the electronic device comprises a tablet, the electronic display comprises a touchscreen display, and receiving user input from the user comprises receiving user input via the touchscreen display.

In a feature of this aspect, the electronic device comprises a slate computer.

In a feature of this aspect, when the selected one of the child sections is highlighted in indication of the user selection, the selected one of the child sections is highlighted by changing a color of the selected one of the child sections.

Another aspect relates to a method comprising displaying, to a user via an electronic display, a first application interface, and a radial control comprising a plurality of concentric arcs, the radial control including a first central section defined by a first arc of the plurality of concentric arcs, and a first plurality of child sections collectively defined by the first arc and a second arc of the plurality of concentric arcs, the child sections of the first plurality of child sections being delineated from one another by dividers extending between the first and second arcs of the plurality of concentric arcs, wherein the first central section is associated with a parent activity, and each of the first plurality of child sections is associated with a second level activity related to the parent activity; and receiving, at an electronic device in electronic communication with the electronic display, user input from the user, the user input corresponding to selection of one of the child sections of the first plurality of child sections; and displaying, to the user via the electronic display, in response to the user input corresponding to selection of one of the child sections, a second application interface, the second application interface being associated with the child activity associated with the selected one of the child sections, the radial control comprising a plurality of concentric arcs, the radial control including the first central section defined by the first arc of the plurality of concentric arcs, and the first plurality of child sections collectively defined by the first arc and the second arc of the plurality of concentric arcs, the child sections of the first plurality of child sections being delineated from one another by dividers extending between the first and second arcs of the plurality of concentric arcs, a second plurality of child sections collectively defined by the second arc and a third arc of the plurality of concentric arcs, the child sections of the second plurality of child sections being delineated from one another by dividers extending between the second and third arcs of the plurality of concentric arcs. The first central section is associated with a parent activity, each of the first plurality of child sections is associated with a second level activity related to the parent activity, and each of the second plurality of child sections is associated with a third level activity related to both the parent activity. The selected one of the child sections of the first plurality of child sections is highlighted in indication of the user selection, whereby the user is able to discern a current activity based on viewing the radial control.

In a feature of this aspect, when the selected one of the child sections is highlighted in indication of the user selection, the selected one of the child sections is highlighted by changing a color of the selected one of the child sections.

In a feature of this aspect, the electronic device comprises a tablet.

In a feature of this aspect, the electronic device comprises a tablet, the electronic display comprises a touchscreen display, and receiving user input from the user comprises receiving user input via the touchscreen display.

Another aspect relates to a system for implementing a disclosed method.

Another aspect relates to a computer readable medium containing computer executable instructions for performing a disclosed method.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
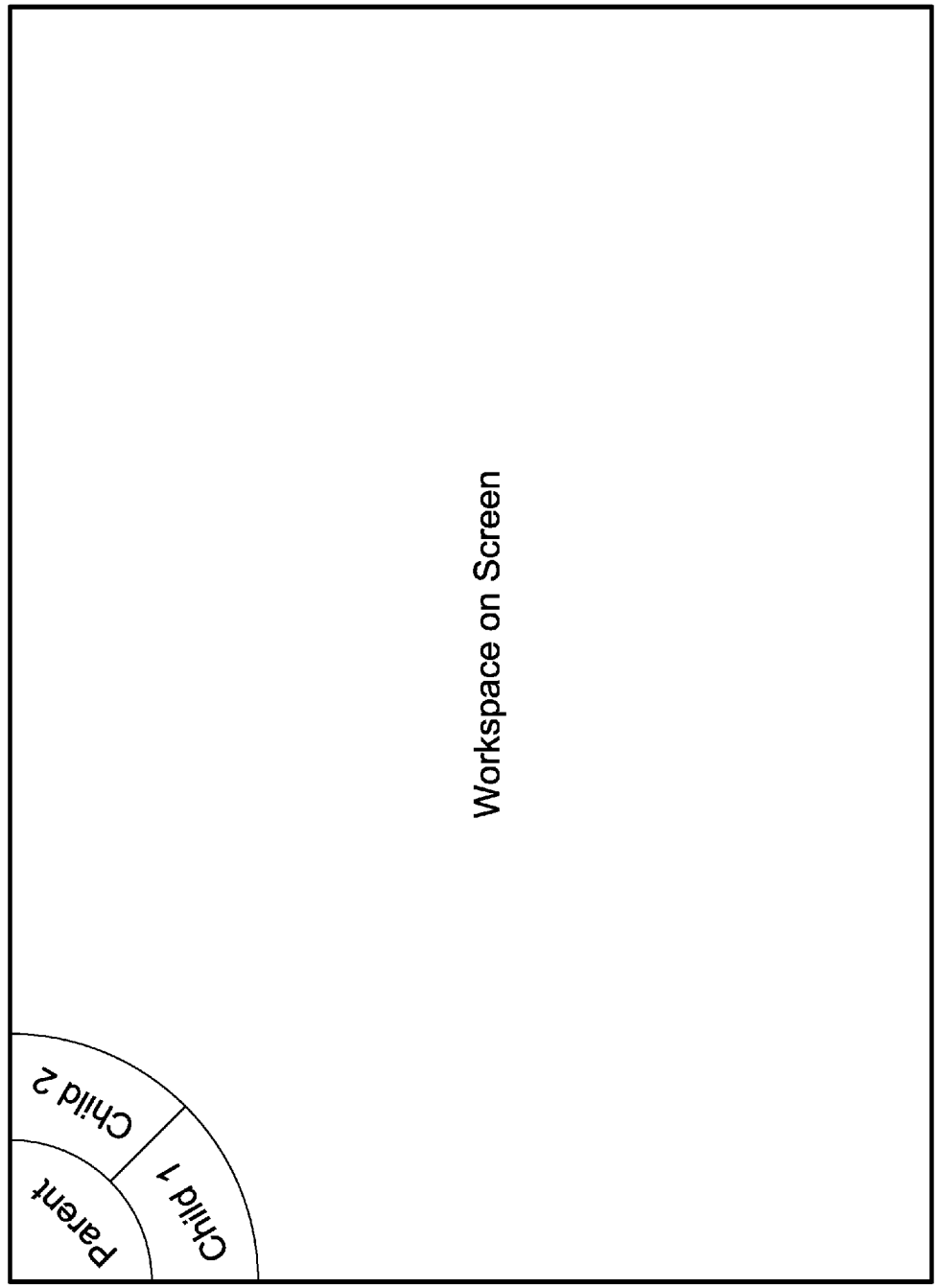
FIG. 1 illustrates a two level radial control.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Systems and methods are disclosed for navigating within a software application, and/or between various software applications. In accordance with an exemplary disclosed method, a radial control is displayed to a user. The radial control preferably includes sections corresponding to a parent activity and at least one child activity. FIG. 1 illustrates an exemplary radial control displayed to the user. The radial control is preferably displayed such that the relationship of each activity to another activity is visually apparent to the user. FIG. 1 illustrates a radial control depicting a parent item, e.g. an activity, and two child items. FIG. 1 displays the items in such a way that it is clear that the items have a parent-child relationship. The illustrated radial control comprises two concentric arcs. The portion defined by the inner arc corresponds to a main, or "parent", item/activity, and the portion defined between the inner arc and the outer arc is divided into as many sections as needed to appropriately depict a number of "child" items.

Figure 2:
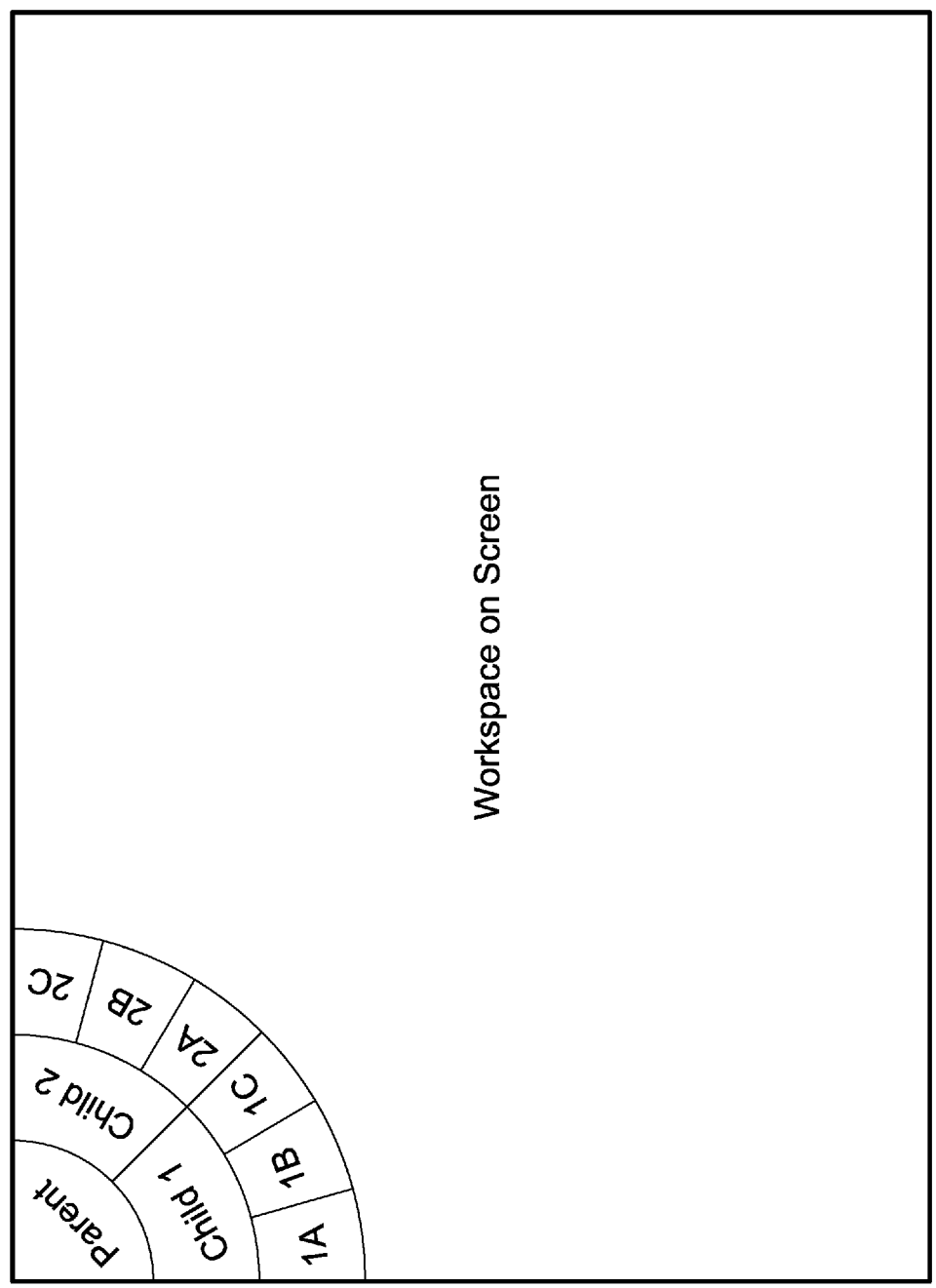
FIG. 2 illustrates a radial control having more than two levels.
Figure 3:
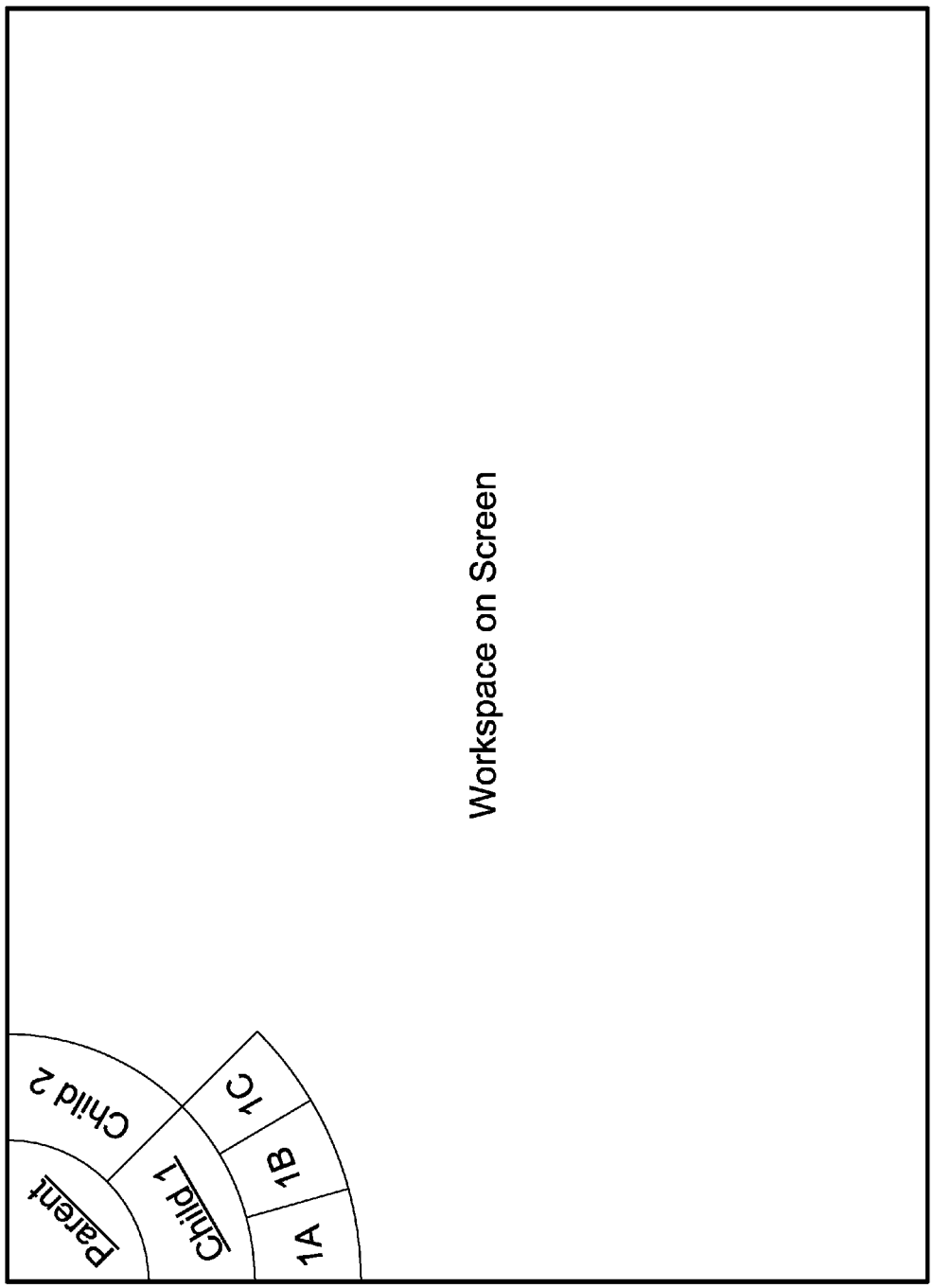
FIG. 3 illustrates a radial control in which a third level extends from a second level item.
Figure 4:
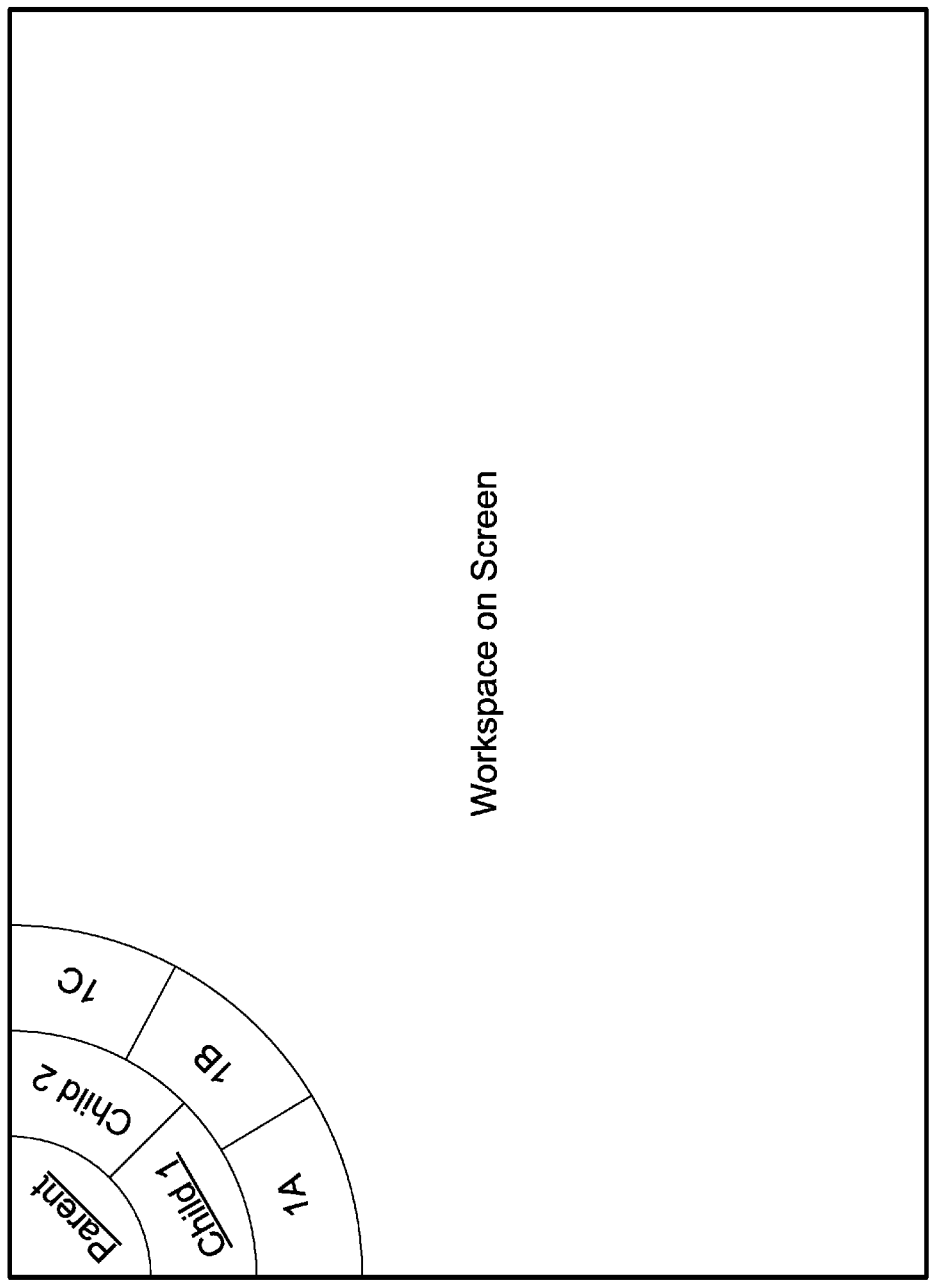
FIGS. 4 and 5 illustrate how items displayed on a level can change as different items on a previous level are highlighted or selected.
Figure 5:
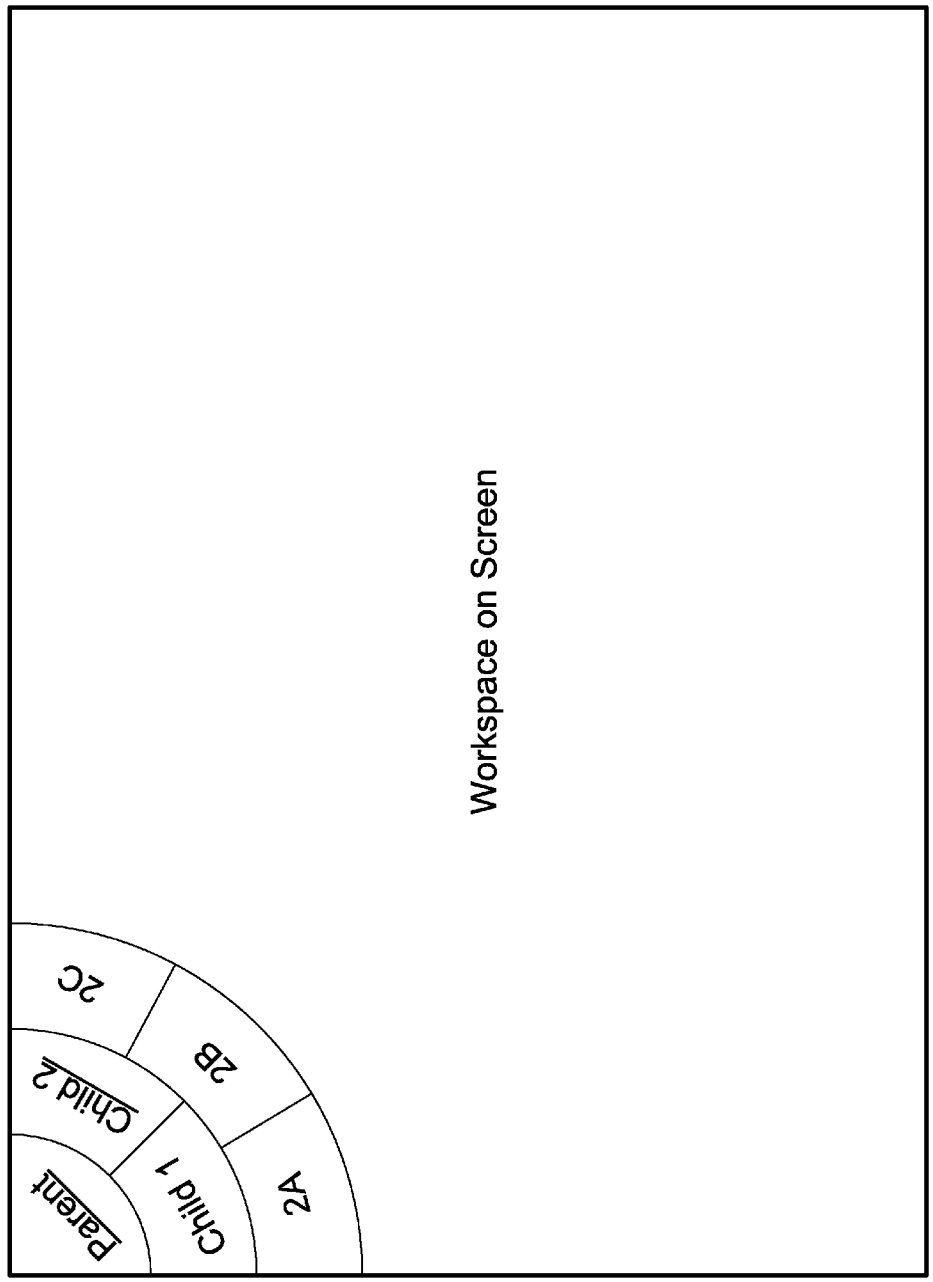

The radial control illustrated in FIG. 1 can be characterized as representing a two level radial control. That is, it has a first level, corresponding to a parent item, and a second level, corresponding to one or more child items. In one or more preferred implementations, a radial control is configured to support additional levels, as illustrated in FIG. 2. In one or more such preferred implementations, items in additional levels beyond the second level are preferably associated with the immediately preceding level. For example, in a preferred implementation, a radial control is configured such that, when necessary, an area defined between a second arc and a third arc is divided into a plurality of sections, each section corresponding to a child item of one of the child items of the second level. In some preferred implementations, the area for displaying third or greater level child items associated with a child item of the previous level is disposed radially outward from, and does not extend beyond the radial lines defining, the section on the previous level corresponding to the previous level item it is associated with, as illustrated in FIG. 2. In some preferred implementations, third or greater level items for multiple prior level child items are displayed concurrently, as illustrated in FIG. 2, while in at least some implementations such items are only displayed when the previous level item is selected, as illustrated in FIG. 3. In some preferred implementations, rather than the area for displaying third or greater level child items associated with a child item of the previous level not extending beyond the radial lines defining the section on the previous level corresponding to the previous level item it is associated with, the area for displaying third or greater level child items associated with a child item of the previous level represents the entire area defined within the corresponding arcs, as illustrated in FIG. 4. The items displayed on such a level can change as different items on the previous level are highlighted or selected, as illustrated in FIGS. 4 and 5.

In accordance with this disclosed implementation, the user may be able to click any part of the control at any time to switch to viewing/using the selected item/activity. Preferably, the radial control is displayed along with the current activity being used by the user. When the user wishes to navigate to another activity, the user may select any one of the activities displayed in the radial control.

Figure 6:
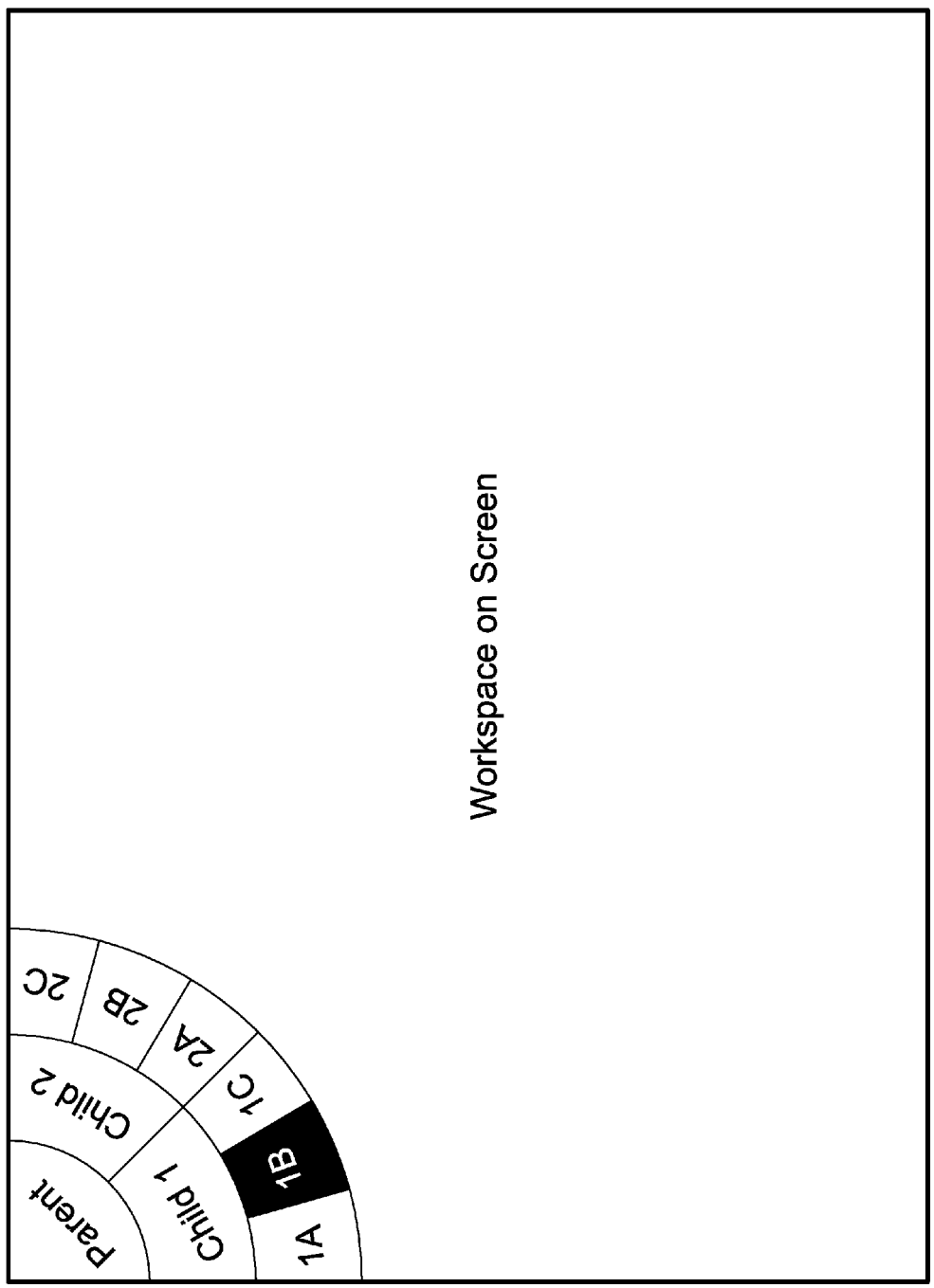
FIG. 6 illustrates coloring or shading of a section of a radial control.

Upon selecting the activity the user wishes to view/use next, the selected activity is displayed, as well as the radial control. It is preferable that an indication on the radial control be made apparent to the user that indicates which of the activities on the radial control that is currently being used by the user. For example, in some preferred implementations, the current activity is highlighted on the radial control such that the user can tell which activity the user is in based on the activity that is a different color or shaded in, as illustrated, for example, in FIG. 6. Also, the user preferably knows the relationship of the current activity to the other activities that are provided in the application.

Figure 7:
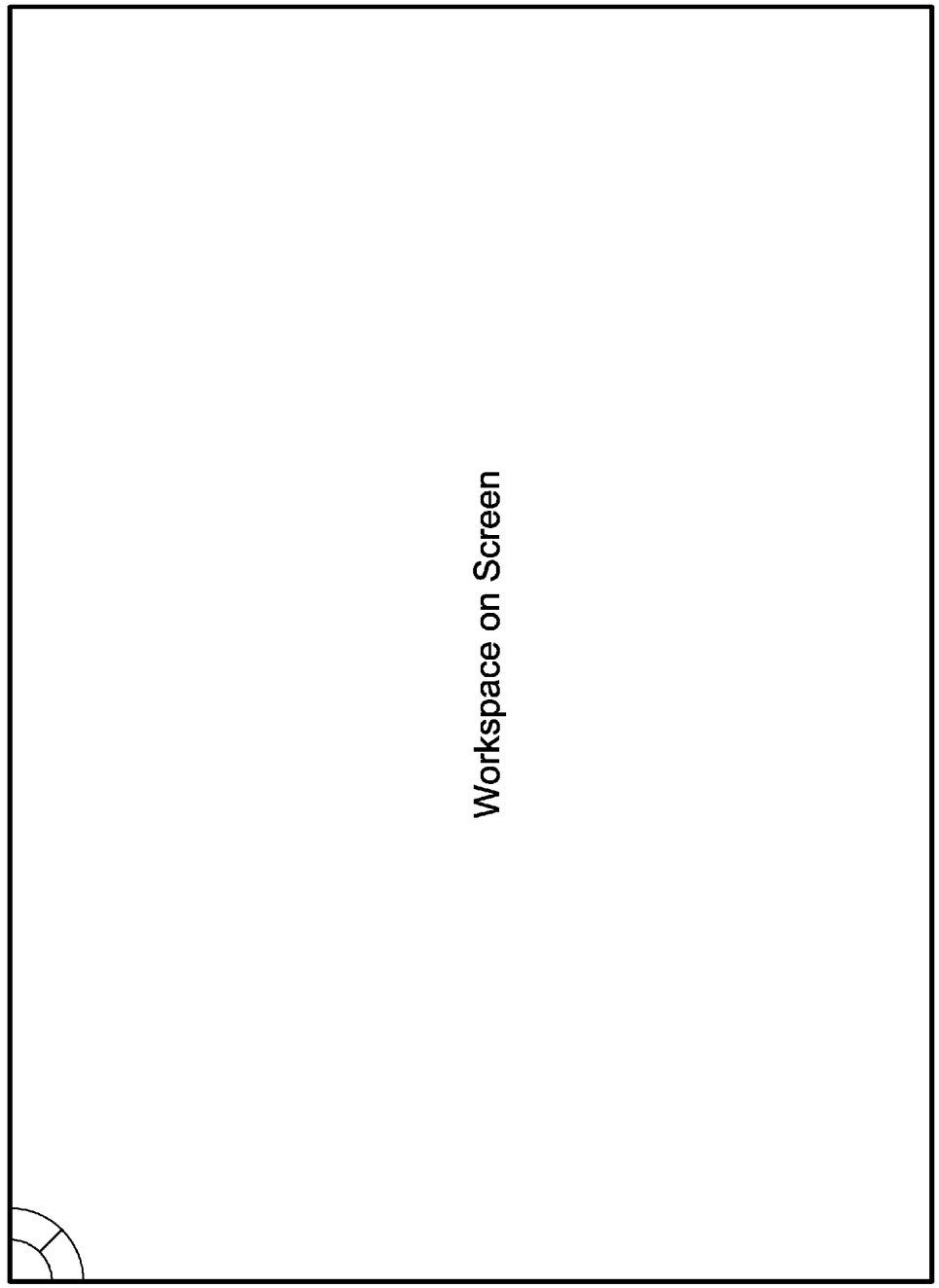
FIG. 7 is an exemplary illustration of a collapsed radial control.

In one or more preferred implementations, a radial control is viewable at all times, but in at least some preferred implementations a radial control is configured to be collapsed and/or hidden at times based on user preference, for example following collapsing by a user or a period of inactivity. FIG. 7 is an exemplary illustration of a collapsed radial control. In one or more preferred implementations, a user may hide a radial control, and then, when needed to navigate through the application, select to view the radial control. In one or more preferred implementations, mousing over, clicking on, or touching (utilizing a touch screen interface) a collapsed radial control and/or associated button or screen area effects expansion of such radial control and/or effects display of a previously not displayed radial control.

Although radial controls have been illustrated herein as being located in the upper left corner of a screen or user interface, in at least some preferred implementations the radial control is located elsewhere. In at least some preferred implementations, the location of a radial control depends on the application, the current activity, or the user's preference.

Additional disclosure of aspects and features in accordance with one or more preferred embodiments of the present invention is included in the Exhibit 1. The entire disclosure of the Exhibit 1 is hereby incorporated herein by reference.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method comprising:
   (a) displaying, to a user via an electronic display,
       (i) a first application interface, and
       (ii) a radial control disposed in a corner of the application interface and extending from a vertical edge of the application interface to a horizontal edge of the application interface, the radial control comprising a plurality of concentric arcs, the radial control including
           (A) a first central section defined by a first arc of the plurality of concentric arcs, and
           (B) a first plurality of child sections collectively defined by the first arc and a second arc of the plurality of concentric arcs, the first plurality of child sections being delineated from one another by one or more dividers extending between the first and second arcs of the plurality of concentric arcs,
           (C) wherein the first central section is associated with a parent activity and each of the first plurality of child sections is associated with a child activity related to the parent activity;
   (b) receiving, at an electronic device in electronic communication with the electronic display, user input from the user, the user input corresponding to selection of a first child section of the first plurality of child sections, the first child section being associated with a first child activity;
   (c) updating, at the electronic display in response to the user input corresponding to selection of the first child section, the radial control to include a second plurality of child sections collectively defined by
       (i) a portion of the second arc defining the selected first child section, and
       (ii) one or more extended divider lines extending outward from the divider lines defining the selected first child section, and
       (iii) a newly displayed arc spaced outwardly from the portion of the second arc defining the selected first child section,
       (iv) wherein the newly displayed arc does not extend beyond the one or more extended divider lines,
       (v) wherein each of the second plurality of child sections is associated with a child activity related to the first child activity;
   (d) receiving, at the electronic device in electronic communication with the electronic display, user input from the user, the user input corresponding to selection of a second child section of the second plurality of child sections;
   (e) displaying, to the user via the electronic display, in response to the user input corresponding to selection of a second child section of the second plurality of child sections, a second application interface, the second application interface being associated with the child activity associated with the selected second child section, wherein the selected one of the child sections is highlighted in indication of the user selection.

2. The method of claim 1, wherein the electronic display comprises a touchscreen display.

3. The method of claim 2, wherein receiving user input from the user comprises receiving user input via the touchscreen display.

4. The method of claim 1, wherein the electronic device comprises a tablet.

5. The method of claim 1, wherein, when the selected one of the child sections is highlighted in indication of the user selection, the selected one of the child sections is highlighted by changing a color of the selected one of the child sections.

6. A method comprising:
   (a) displaying, to a user via an electronic display,
       (i) a first application interface, and
       (ii) a radial control disposed in a corner of the application interface, the radial control comprising a plurality of concentric arcs extending from a vertical edge of the application interface to a horizontal edge of the application interface, the radial control including
           (A) a first central section defined by a first arc of the plurality of concentric arcs, and
           (B) a first plurality of child sections collectively defined by the first arc and a second arc of the plurality of concentric arcs, the first plurality of child sections being delineated from one another by one or more dividers extending between the first and second arcs of the plurality of concentric arcs, (C) wherein the first central section is associated with a parent activity and each of the first plurality of child sections is associated with a child activity related to the parent activity;
(b) receiving, at an electronic device in electronic communication with the electronic display, user input from the user, the user input corresponding to selection of a first child section of the first plurality of child sections, the first child section being associated with a first child activity;
(c) updating, at the electronic display in response to the user input corresponding to selection of the first child section, the radial control to include a second plurality of child sections collectively defined by
   (i) a portion of the second arc defining the selected first child section, and
   (ii) one or more extended divider lines extending outward from the divider lines defining the selected first child section, and
   (iii) a newly displayed arc spaced outwardly from the portion of the second arc defining the selected first child section,
   (iv) wherein the newly displayed arc does not extend beyond the one or more extended divider lines,
   (v) wherein each of the second plurality of child sections is associated with a child activity related to the first child activity;
(d) receiving, at the electronic device in electronic communication with the electronic display, user input from the user, the user input corresponding to selection of a second child section of the second plurality of child sections;
(e) displaying, to the user via the electronic display, in response to the user input corresponding to selection of a second child section of the second plurality of child sections, a second application interface, the second application interface being associated with the child activity associated with the selected second child section, wherein the selected one of the child sections is highlighted in indication of the user selection.

7. A method comprising:
(a) displaying, to a user via an electronic display,
   (i) a first application interface, and
   (ii) a radial control comprising a plurality of concentric arcs disposed in a corner of the application interface, the radial control extending from a vertical edge of the application interface to a horizontal edge of the application interface, the radial control including
      (A) a first central section defined by a first arc of the plurality of concentric arcs, and
      (B) a first plurality of child sections collectively defined by the first arc and a second arc of the plurality of concentric arcs, the first plurality of child sections being delineated from one another by one or more dividers extending between the first and second arcs of the plurality of concentric arcs,
      (C) wherein the first central section is associated with a parent activity and each of the first plurality of child sections is associated with a child activity related to the parent activity;
(b) receiving, at an electronic device in electronic communication with the electronic display, user input from the user, the user input corresponding to selection of a first child section of the first plurality of child sections, the first child section being associated with a first child activity;
(c) updating, at the electronic display in response to the user input corresponding to selection of the first child section, the radial control to include a second plurality of child sections collectively defined by
   (i) a portion of the second arc defining the selected first child section, and
   (ii) one or more extended divider lines extending outward from the divider lines defining the selected first child section, and
   (iii) a newly displayed arc spaced outwardly from the portion of the second arc defining the selected first child section,
   (iv) wherein the newly displayed arc does not extend beyond the one or more extended divider lines,
   (v) wherein each of the second plurality of child sections is associated with a child activity related to the first child activity;
(d) receiving, at the electronic device in electronic communication with the electronic display, user input from the user, the user input corresponding to selection of a second child section of the second plurality of child sections;
(e) displaying, to the user via the electronic display, in response to the user input corresponding to selection of a second child section of the second plurality of child sections, a second application interface, the second application interface being associated with the child activity associated with the selected second child section, wherein the selected one of the child sections is highlighted in indication of the user selection;
(f) determining that a predetermined period of time has passed without the displayed radial control having been utilized; and
(g) collapsing, based on the determination that a predetermined period of time has passed without the radial control having been utilized, the displayed radial control so as to reduce the size of the radial control and the footprint of the radial control on the display.

8. The method of claim 7, wherein collapsing the displayed radial control comprises reducing the distance between the plurality of concentric arcs of the radial control.

9. The method of claim 7, wherein the method further includes
(a) receiving, at the electronic device, user input from the user, the user input corresponding to a touching of the radial control; and
(b) expanding, in response to the receiving user input corresponding to a touching of the radial control, the radial control.

* * * * *